UNITED STATES PATENT OFFICE.

JAMES GOULD, OF LEXINGTON, MASSACHUSETTS.

IMPROVED FERTILIZER.

Specification forming part of Letters Patent No. 52,844, dated February 27, 1866.

*To all whom it may concern:*

Be it known that I, JAMES GOULD, of Lexington, in the county of Middlesex and State of Massachusetts, have made a new and useful Improvement in Fertilizers which are especially useful in destroying and repelling insects, of which the following is a specification.

My improvement is founded on the use of carbolic or phenic acid and creosote with hydrocarbons in mixture with lime, salt, vegetable and animal matters, and ammonia, by which I am enabled to control the action of carbolic acid and hydrocarbons and to render them of great utility in agriculture and horticulture.

Carbolic acid, creosote, and hydrocarbons exist in lime which has been used for purifying coal-gas, and this lime has often been tried as a fertilizer, and as often rejected on account of its destructive action, which continues for a long time, so that gas-lime has been deemed of no value agriculturally. In an investigation of this subject I have discovered a mode of rendering this gas-lime, heretofore a waste body, useful both as a fertilizer and for destroying insect-life by combining the carbolic acid and carbo-hydrogens with lime intimately.

To effect the change I ferment the gas-lime in mixture with animal and vegetable matter, moisture being present. Gas-lime contains cyanogen and ammonia salts, sulphites, sulphates, besides carbolic acid, creosote, and carbo-hydrogens. I add a mild kind of lime, some quickly-fermentable animal and vegetable matter, and salt, which is also necessary, to the gas-lime, and then pack away the mass, well moistened with crude ammonia and tar-water of the gas-works. After the protected heaps have reposed two or three weeks and have been moistened from time to time, crenic and nitric compounds are formed and the fertilizer becomes matured.

To enable one skilled in the art to manufacture my fertilizer, which is also a disinfectant, I proceed to describe my process.

I take one ton of gas-lime from gas-works, using oyster or slaked lime for purifying gas, and I mix from thirty to forty per cent. of fish-offal or of blood with about ten per cent. of sumac or other fermentable vegetable matter; or, instead of the aforesaid offal, blood, and sumac, I add about forty per cent. of vegeto-animal matter, as sugar-refiners' scum. I then add four tons of oyster-shell or other lime which has been slaked and two hundred and fifty pounds of crude salt or chloride of sodium, shoveling over the whole so as to intimately mix the parts. During the warm season this mixture is made wet with ammonia-water from the gas-works, containing a greater or less amount of coal-tar, and when it appears dry more ammonia-water must be added, which hastens fermentation. When the heat of fermentation ceases the carbolic acid and other products have combined with the lime, which has been rendered mild, much soluble matter has been formed, and the fertilizer is completed.

I do not strictly confine myself to the above proportions, as some gas-lime contains more carbolic acid than another kind, and I judge of the strength by smell or taste, and use more or less lime as the gas-lime is stronger or weaker. And in place of scum other vegeto-animal matter which will produce fermentation may be used—as, for instance, the contents of cesspools, animal-manure, &c. The fermentation must be of the humid kind, and sufficient vegeto-animal matter must be used to insure active fermentation and diffusion of the carbolic acid and creosote throughout the mass.

I do not claim the addition of gas-lime to manure or compost heaps or the use of it with soil.

What I claim, and wish to secure by Letters Patent, is—

The process of formation of a fertilizer by fermenting mixtures of gas-lime, lime, salt, and animal and vegetable or vegeto-animal matter, as above described.

JAMES GOULD.

Witnesses:
CHARLES HUDSON,
ELLEN MARIA GOULD.